Patented June 6, 1950

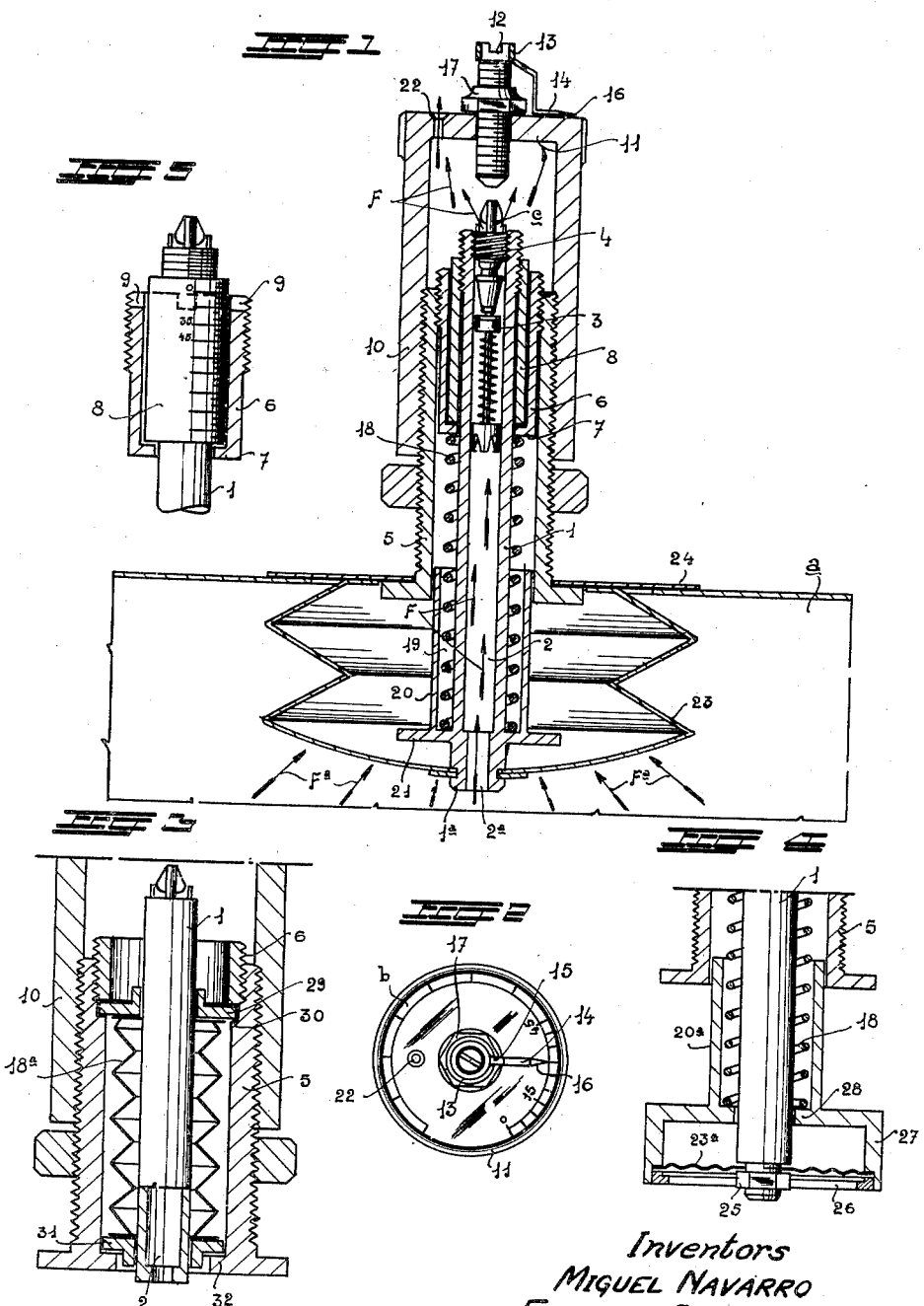

2,510,052

UNITED STATES PATENT OFFICE 2,510,052

PRESSURE CONTROL DEVICE FOR PNEUMATIC TIRES

Miguel Navarro, Enrique Joaquin Llovet, and Aurelio Eduardo Llovet, Buenos Aires, Argentina Application March 26, 1946, Serial No. 657,292
In Argentina January 18, 1946

3 Claims. (Cl. 137—69.5)

The present invention refers to a device for controlling and automatically balancing the internal pressure in pneumatic tubes used in tires for automotive vehicles in general, said device being appropriate for use with tubes of the kind referred to in connection with check valves of known construction through which air is injected into the tubes.

An essential factor of this device consists in providing an assembly having means for automatically balancing the internal gaseous pressure within the tubes, when such pressure increases beyond the required limit.

Another factor of the present invention consists in providing means for controlling the charge of the tubes to the required degree of pressure, which means are subjected to linear shifting as the tube is being filled, thus indicating the progressive increase of the internal pressure built up therein.

A further factor subordinated to the preceding one, consists in providing resilient means in connection with one of the moving parts of the device, which means automatically permits of discharging the excess amount of air from the pneumatic tube as the pressure therein increases due to various causes among which the most important one is derived from the overheating of the tubes, giving rise to an increase in pressure; this increase being neutralized by the gradual discharge of air taking place until the tubes will be inflated at the normal degree of pressure.

An additional factor of this device consists in providing the portion thereof arranged within the tubes, with a resilient area acted upon by the pressures therein to transmit such pressures to one of the moving members of the device, imparting thereto the required sensibility for permitting discharge of the surplus pressure.

The device concerned, by reason of its double functional action of control of the internal pressure in pneumatic tubes and the resulting automatic balance of this internal pressure, brings about the solution of a problem whereby it is adapted for application to any type of pneumatic tube, both the tubes used with passenger cars of limited carrying capacity, requiring, for this reason, the use of low-pressure pneumatic tires, and such tubes for use with cargo carrying vehicles requiring in general the use of high pressure tires.

The device in itself is constituted in the manner to be described in detail hereinafter, in accordance with the accompanied drawings, in which:

Figure 1 is an elevation showing the device in axial section, coupled to a pneumatic air tube shown in fragmentary view.

Figure 2 is a plan view showing part of the members forming the device.

Figure 3 is an elevation showing in fragmentary view the device in a variant embodiment of its main members.

Figure 4 is an elevation showing a fragmentary view of the device in another variant embodiment.

Figure 5 is a fragmentary detail of the device showing in elevation other details of functional order.

As represented in Figures 1, 2 and 5, the device is composed as follows: A discharge tube 1 for the disposal of the surplus internal pressure contained within the pneumatic tube, through the axial duct 2 thereof, and closed by the check valve 3 of known construction, the supporting and guiding body whereof is coupled by means of screw threads to the upper opening of the tube 1, constitutes in itself the self-regulating means for the internal pressure within the pneumatic tube.

The discharge tube 1 is coupled in turn, with a limited reciprocal linear motion, to a supporting tube 5, the lower opening whereof is fastened by means of a flange against the pneumatic tube a, shown in fragmentary view in Figure 1, in the interior whereof the discharging tube referred to extends, being coupled with a limited linear motion, to said supporting tube 5, by means of a cap 6 screwed to the supporting tube 5, and ending in an internal annular shoulder 7, which forms a seat for the lower end of a bushing 8, adjustably screwed to the upper end of the discharge tube 1. This bushing 8, being both a guide means for the linear play of the discharge tube 1, and a gauging means for the pressure charge within the tube a, is provided to this end on its external surface, with a scale having graduations corresponding to the different degrees of pressure, as clearly shown in Figure 5, the indications of which are visible for reading through notches 9 formed in the upper end of the cap 6.

The supporting tube 5 carries fastened thereto by screw threads on its upper section, a cover 10 enclosing the members integrating the device, and protecting them against the entrance of dust and against damage due to impacts or any other accidents. Said cover 10 carries fastened thereto by adjustable screw means on its top 11, a stem 12 having micrometrical screw threads, to the upper end whereof is fastened the collar 13 of a pressure recording pointer 14 which is extended at right angles into a vertical arm 15. Said pointer has its indicating end 16 arranged to rotate over a dial b disposed on the top 11, the figures of which correspond to the different pressures at which the pneumatic tube a may be inflated. The threaded stem 12 is provided with a lock nut 17, for fastening it in the adjusted position required for preventing excessive pressure rise in the pneumatic tube.

The discharge tube 1 is surrounded externally by a spiral spring 18, acting against the internal pressure of the pneumatic tube. Said spring 18 is adjustable in its tension by the greater or lesser degree at which the cap 6 is screwed down into the supporting tube 5, and with its lower end, said spring is bearing against the bottom of an annular recess 19, formed between the external periphery of the discharge tube 1, and the internal periphery of a concentrical tubular extension 20 parting from the widened base 21 of said tube, and ending in a mouth-piece 1a having a passage 2a which is the extension or lowermost terminal of the duct 2, communicating with the tube a through said lowermost passage 2a for the discharge of excess air in the direction of the arrows f to the atmosphere through the outlet opening 22 in the top 11 of the cover 10.

The spring 18 will keep the discharge tube 1 in a position where its bushing 8 is normally seated against the internal shoulder 7 of the cap, as long as the internal pressure of the tube 8 does not surpass the limit to which it has been adjusted.

The discharge tube 1 carries fastened thereto by tight fit or any other suitable fastening means, on the external periphery of its mouthpiece 1a, the lower end of a resilient member formed by a bellows-shaped cover 23, fastened with its opposed end against a flange 24 forming the holding means of the device with regard to the tube a. This cover 23 has a wide incidence area to be acted upon by the internal pressures reigning within the tube a, as shown by the arrows Fa in Figure 1, imparting a higher degree of sensitivity to the device, with regard to the action of the variable pressures within tube a.

The resilient member formed by the bellows-shaped cover 23, may be optionally constituted, as shown in Figure 4, by an undulated diaphragm of high flexibility 23a, which is fastened directly at its center portion to the lowermost end of the discharge tube 1, penetrating into the tube, with the aid of a lock nut 25, and by its external peripheral border said diaphragm is fastened by means of a locking ring 26 to the lowermost end of a skirt 27 of the bushing 20a which is equivalent to the tubular concentrical extension 20 of the embodiment shown in Figure 1, with the difference that an independent body of the discharge tube 1 is formed. This bushing is also provided with an annular shoulder by way of an internal rim 28, forming the seating surface for the lower end of the spring 18, and by its upper end, said bushing 20a is slidably engaged with the lower zone of the supporting tube 5, adapted to be coupled, in the same manner as described for the embodiment of Figure 1, to the tube a, not shown in the variant embodiment according to Figure 4.

In Figure 3, a second embodiment, in accordance with the characteristic features pointed out before, is disclosed, this variant being related to the spiral spring 18 which in this case is substituted by a tubular bellows-shaped cover 18a, fastened at its upper end to a washer 29 which is kept in close fit against a seat 30, formed in the upper zone of the supporting tube 5 by means of the cap 6, whereas with its lower portion, said cover is fastened to a washer 31, kept against a seat 32 formed by an annular internal shoulder of the base of supporting tube 5, being fastened thereagainst by screwing down the cover 10, the device showing in all other respects no difference from the matter described hereinbefore.

The working of the device takes place in the following manner, comprising two cycles: one being the gaseous pressure charge introduced with visible gauging of the pressure built up, and the other being when the internal pressure within the tube—by reason of internal overheating of the latter, generating the corresponding excess pressure—is to be automatically brought back to its normal limit. In the first case, the charge of the tube is effected in the known way by connecting the inflating coupling to the projecting end of tube 1, and injecting the charge up to the limit required as shown by the scale of bushing 8, the indications whereof will become visible as they register with the bottom of the notches 9 of cap 6. Once the tube is charged, the cover 10 is applied, after adjusting the position of the stem 12, recorded by the indicating end 16 of the pointer 15, which is to be set in front of the figure on the dial b of the cover 11, corresponding to the maximum degree of pressure which it is desired to keep within the tube.

When the vehicle is running, and due to running conditions or to the outer hot atmosphere, the tube is overheated creating an internal overpressure acting upon the diaphragm 23 or 23a, and optionally upon the lowermost end of the discharge tube 1, according to the embodiment of the device disclosed in Figures 1, 3 and 4, imparts a linear upward motion to the tube 1, until the end c of the check valve 3 will enter into contact with the inward end of stem 12 within the cover 10, causing the valve 3 to open, and giving free way to the passage of air through the duct 2 of tube 1, and through the internal portion of the upper zone of cover 10, see arrows F, the escaping air issuing through the outlet opening 22 in the top 11. When the pressure within the tube is reduced to the normal degree, the tube 1 returns to its starting position, the valve 3 being automatically closed and the internal overpressure within the tube thus neutralized, thereby avoiding the contingencies inherent to excess pressures.

It is evident that within the scope described and disclosed in the accompanying drawings, it is possible to introduce modifications of details in the assembly constituting the device, it being understood that the inventors reserve their rights to carry such eventualities into practice, without going beyond the limits and scope of the claims set forth hereinafter.

Having now particularly ascertained and described the nature of our said invention and the manner how the same is to be carried into practice, we hereby declare that what we claim to be of our exclusive right and property, is:

1. An inflation relief-valve for use with a pressure chamber and comprising a valve casing having a vent at one end thereof, a discharge tube slidable in said casing and providing a port at the other end of said casing, a graduated bushing connected to said discharge tube in axially adjustable position, means connected to said casing in position to abut against said bushing and arrest movement of said bushing and tube in one direction, a check valve in said discharge tube, means connected to said casing and adapted to open said check valve and establish communication between the port and said vent when said tube moves in the other direction, means responsive to external fluid pressure and connected to said discharge tube and adapted to urge said discharge tube in said one direction in response to low external pressure and oppositely on high external pressure, means for adjusting the position, relatively to said check valve, of the said valve opening means in accordance with a predetermined valve of said external pressure, and resilient means urging said tube away from said valve opening means.

2. A relief-valve according to claim 1 including a dial on said casing and a pointer connected to said valve opening means and cooperating with said dial to indicate the adjusted position of said valve opening means.

3. A relief-valve according to claim 1 including means for adjusting the position, relatively to said casing, of the means arresting movement of said bushing and tube in said one direction.

MIGUEL NAVARRO.
ENRIQUE JOAQUIN LLOVET.
AURELIO EDUARDO LLOVET.

REFERENCES CITED

The following references are of record in the file of this patent:

UNITED STATES PATENTS

| Number | Name | Date |
|---|---|---|
| 1,207,882 | Dorff | Dec. 12, 1916 |
| 1,229,860 | Ashelman | June 12, 1917 |
| 1,265,693 | Manning | May 7, 1918 |
| 1,503,759 | Kraft | Aug. 5, 1924 |
| 1,694,286 | Shorts | Dec. 4, 1928 |
| 1,869,051 | Davis | July 26, 1932 |